United States Patent

[11] 3,602,056

| [72] | Inventor | Fred A. Ohlinger<br>540 W. Solano Drive, Phoenix, Ariz. 85013 |
|---|---|---|
| [21] | Appl. No. | 34,076 |
| [22] | Filed | May 4, 1970 |
| [45] | Patented | Aug. 31, 1971 |

[54] SPEED CONTROL FOR DRIVE SHAFT
4 Claims, 7 Drawing Figs.

| [52] | U.S. Cl. | 74/331 |
|---|---|---|
| [51] | Int. Cl. | F16h 3/08 |
| [50] | Field of Search | 74/329, 331, 342, 344 |

[56] References Cited
UNITED STATES PATENTS

| 1,453,032 | 4/1923 | Von Soden-Fraunhofen | 74/331 |
|---|---|---|---|
| 1,527,247 | 2/1925 | Bouillon | 74/344 X |
| 2,349,064 | 5/1944 | Weaver | 74/342 UX |
| 2,791,912 | 5/1957 | Bixby | 74/344 |

*Primary Examiner*—Arthur T. McKeon
*Attorney*—Warren F. B. Lindsley

ABSTRACT: A control mechanism for the drive shaft of a motor which provides a plurality of speeds axially of the rotor shaft.

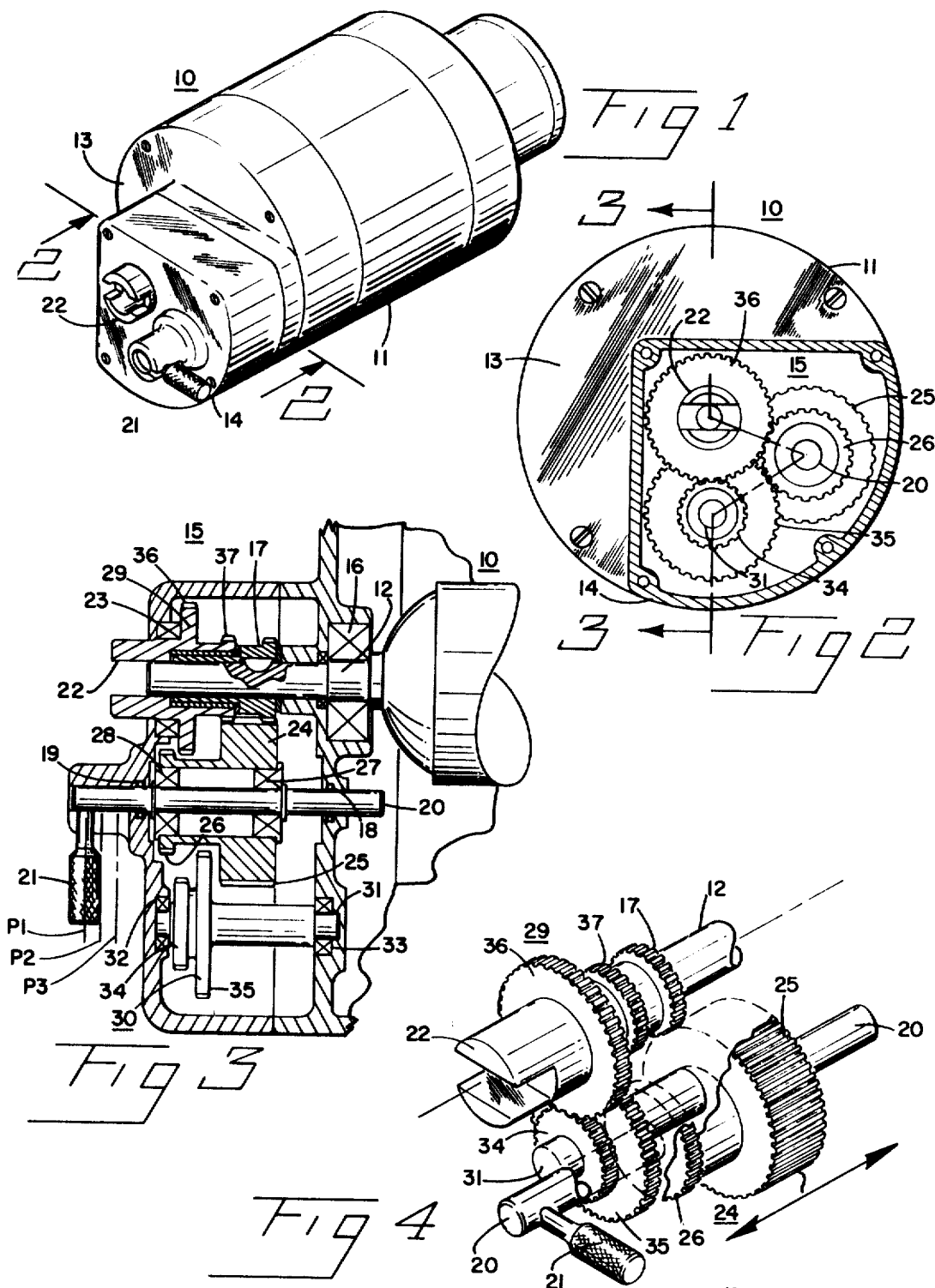

*INVENTOR*
FRED A. OHLINGER
BY Warren F. B. Sindsey

ATTORNEY 3,602,056

SPEED CONTROL FOR DRIVE SHAFT

BACKGROUND OF THE INVENTION

This invention relates to machine tools and more particularly to improvements in speed control mechanisms for the drive shafts of electric motors so that a plurality of speeds may be readily obtained axially of its rotor.

1. Field of the Invention

This invention is particularly directed to improvements in the arrangement of the gear train and driving mechanism of an electric motor so that more than one speed may be obtained axially from the rotor shaft of the motor. It is important in given motor installations to be able to adapt a single speed electric motor to a range of speeds for various forms of work without employing a plurality of different driven axes and additionally substantially increasing the overall longitudinal dimension of the motor and drive shaft arrangement. Single speed motors, heretofore have been limited in application since the power transmission necessary to obtain a wide range of axial speeds necessary for various forms of work required an overall redesign of the power drive mechanism.

2. Description of the Prior Art

Heretofore control elements have been provided for machine tools such as lathes wherein a wide range of speeds of a headstock are selected by movement of a single control element. This speed control comprising a range of gear drives renders the machine capable of large variety of uses. Small synchronous horsepower electric motors built into a drive assembly usually were not capable of a wide range of speeds without extensive gearing arrangement which usually resulted in a complete redesign of the power train thus limiting or greatly reducing the machine tool's versatility.

SUMMARY OF THE INVENTION

In accordance with the invention claimed a new and improved gear train and driving transmission mechanism for an electric motor is provided which provides a variety of output speed on the same axis without increasing the overall length of the motor drive arrangement.

It is, therefore, one object of this invention to provide an improved and simplified transmission gearing mechanism which is capable of providing different axial speeds along the rotor shaft of an electric motor.

Another object of this invention is to provide an improved gearing mechanism for a synchronous motor which provides a plurality of drive speeds axially of the motor's rotor shaft without increasing the overall length of the motor and drive train dimensions.

A further object of this invention is to provide a single handle control arrangement for an improved gear train for varying the speed of a synchronous motor.

A still further object of this invention is to provide an efficient, flexible and inexpensive drive train for obtaining a plurality of speeds from an electric motor axially of its rotor shaft.

Further objects and advantages of this invention will become apparent as the following description proceeds and the features of novelty which characterizes this invention will be pointed out with particularity in the claims annexed to and forming part of this specification.

BRIEF DESCRIPTION OF THE DRAWING

The present invention may be more readily described by reference to the accompanying drawing in which:

FIG. 1 is a perspective view and an electric motor and gear train transmission mechanism and embodying the invention;

FIG. 2 is a cross-sectional view of FIG. 1 taken along the line 2—2 in the direction of the arrows;

FIG. 3 is a cross-sectional view of the entire gear train mechanism shown in FIGS. 1 and 2 particularly showing the gear train in one of its drive positions;

FIG. 4 is a perspective view of the gear train mechanism of FIGS. 1–3 wherein the relative position of the drive and driven shafts are shown.

DESCRIPTION OF PREFERRED EMBODIMENT

Figure 5:
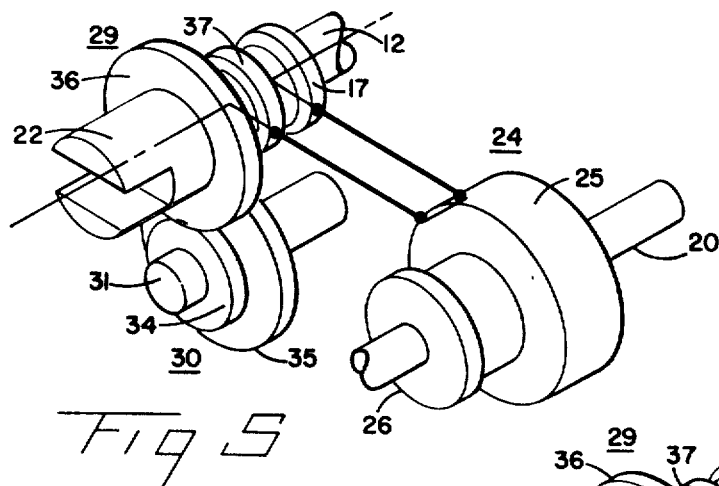
FIGS. 5, 6 and 7 illustrate in diagrammatic, distorted views the torque drive of the gear train mechanism in its three drive positions.
Figure 6:
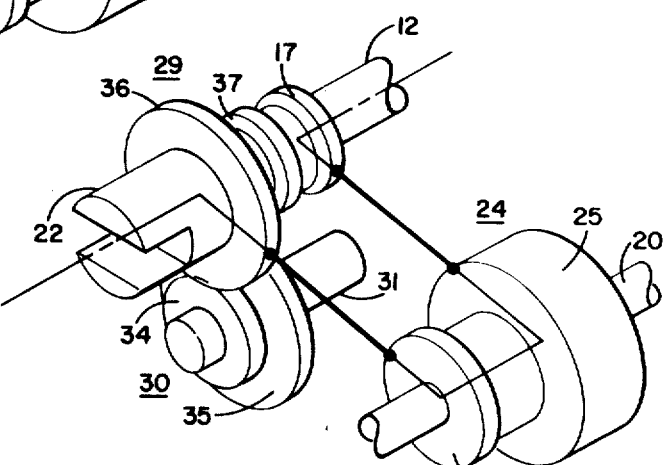

Referring more particularly to the drawing by characters of reference, FIG. 1 discloses an electric motor 10 such as, for example, a fractional horsepower synchronous motor having a housing 11 through which extends, as shown in FIG. 3, the drive shaft 12 connected to its rotor (not shown). The face plate 13 of housing 11 has mounted on it a gear box 14 which houses an improved gear train transmission 15. The power drive for driving the gear train transmission 15 is obtained from drive shaft 12 mounted on suitable bearings 16 in gear box 14. On this drive shaft is fixed a gear 17.

Journaled in the gear box 14 on bearings 18 and 19 is an intermediate shaft 20 with a handle 21 for actuating it manually longitudinally a predetermined distance in gear box 14 to positions $P_1$, $P_2$ and $P_3$ thereby varying the gear setting for varying the output speeds of driven shaft 22.

Driven shaft 22 is coaxially mounted on and supported by drive shaft 12 and journaled in the gear box by bearing 23.

Slidably mounted on the intermediate shaft 20 is a double gear 24 having gears 25 and 26 spacedly arranged along the longitudinal axis of shaft 20. The double gear 24 is journaled on shaft 20 on bearings 27 and 28.

When intermediate shaft 20 is moved axially gear 25 moves axially along gear 17 with which it is at all times in meshing engagement. Gear 26 of double gear 24 when moved axially along shaft 20 moves into and out of meshing engagement with a double gear 29, having gears 36 and 37 fixedly mounted on driven shaft 22, and a double gear 30 mounted on an idler shaft 31.

Idler shaft 31 is journaled in gear box 14 on bearings 32 and 33 a double gear 30 has mounted on its gears 34 and 35. Double gear 30 is at all times in meshing engagement with double gear 29 as more clearly shown in FIGS. 2, 5, 6 and 7. More particularly, as shaft 20 is moved axially of its housing, gear 26 will mesh with or disengage with gear 35.

With reference to FIGS. 2–7 when handle 21 and intermediate shaft 20 are in the handle pulled out position $P_1$, i.e. as shown in FIGS. 3 and 5, the electric motor 10 is directly driving the driven shaft 22 through double gear 24. This action occurs through the meshing engagement of gear 17 with gear 25 of double gear 24 and gear 25 with gear 37 of double gear 29 mounted on driven shaft 22. The driven shaft is moving at the same speed as the drive shaft 12.

When electric motor 10 is stopped handle 21 may be rotated slightly if necessary for disengaging and engaging the gears in the gear train and then moved longitudinally of shaft 20 to positions $P_2$ or $p_3$ causing shaft 20 to move axially toward electric motor 10. Movement of handle 21 to position $P_2$ causes gear 25 to remain in meshing engagement with gear 17 on drive shaft 12 but at a different position along the width of the teeth on gear 25. Power is transmitted, as shown in full lines in FIG. 6, from shaft 12 through gear 17 to shaft 22 through the meshing engagement of gear 17 with gear 25. Gear 26 on shaft 20 is in meshing engagement now with gear 36 on driven shaft 22 and drives driven shaft 22 at a different speed determined by the gear ratio of the gear train.

Figure 7:
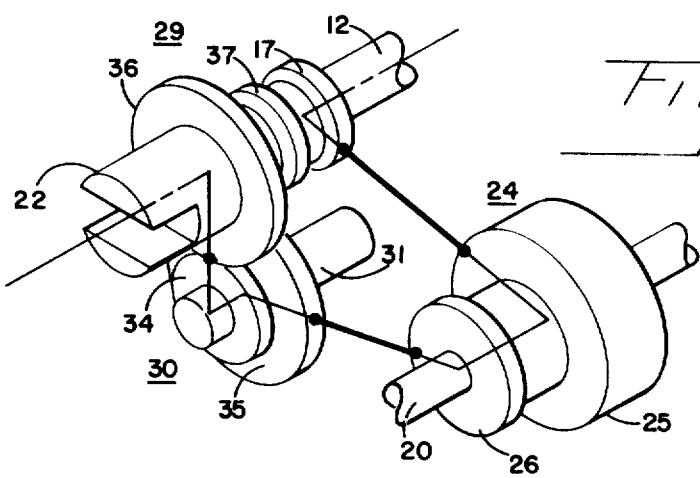

When the electric motor 10 is again stopped the handle 21 may be axially moved again toward the motor to its innermost position $P_3$ where the gears in the gear train are shown as indicated in FIG. 7.

In the innermost position of handle 21, gear 17 is in meshing engagement with gear 25 and gear 26 of the double gear 24 is in meshing engagement with gear 35 of the idler shaft 31.

Gear 34 is at all times in meshing engagement with gear 36 of driven shaft 22 as shown in FIGS. 2, 5, 6 and 7.

Although but one embodiment of the present invention has been illustrated and described it will be apparent to those skilled in the art that various changes and modifications may be made therein without departing from the spirit of the invention or from the scope of the appended claims.

I claim:

1. In a machine tool,
a support,
a drive shaft rotatively mounted on said support,
a driven shaft rotatively mounted on said support and coaxially arranged with and supported by said drive shaft,
a first gear mounted on said drive shaft,
a first double gear comprising a first gear and a second gear mounted on said driven shaft,
an intermediate shaft rotatively mounted on said support and axially moveable to a plurality of positions,
said intermediate shaft having a second double gear comprising a first gear and a second gear mounted thereon,
and an idler shaft rotatively mounted on said support,
said idler gear having a third double gear comprising a first gear and a second gear,
said intermediate shaft being selectively moveable to a first position wherein said first gear of said second double gear is in meshing engagement with said first gear on said drive shaft and said first gear of first double gear on said driven shaft to drive said driven shaft at a first speed,
said intermediate shaft being selectively moveable to a second position wherein said first gear of said second double gear is in meshing engagement with said first gear on said drive shaft and said second gear of said second double gear is in meshing engagement with said second gear of said first double gear on said driven shaft to drive said driven shaft at a second speed,
said intermediate shaft being selectively moveable to a third position wherein said first gear of said second double gear is in meshing engagement with said first gear on said drive shaft and said second gear of said second double gear is in meshing engagement with said first gear of said third double gear on said idler shaft, said second gear of said third double gear being in meshing engagement with said second gear of said first double gear to drive said driven shaft at a third speed,
said second gear of said third double gear being in constant meshing engagement with said second gear of said first double gear on said driven shaft.

2. The combination set forth in claim 1 wherein a handle is mounted on the free end of said intermediate shaft for moving said shaft to said plurality of positions.

3. The combination set forth in claim 1 wherein said second speed is at a reduced speed from said first speed.

4. The combination set forth in claim 1 wherein said third speed is at a reduced speed from said second speed.